United States Patent
Duan et al.

(10) Patent No.: US 8,254,566 B2
(45) Date of Patent: Aug. 28, 2012

(54) SLIDING MECHANISM AND ELECTRONIC DEVICE HAVING THE SAME

(75) Inventors: Chao Duan, Shenzhen (CN); Fan-Zhe Ding, Shenzhen (CN); Chia-Hua Chen, Taipei (TW)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 337 days.

(21) Appl. No.: 12/779,127

(22) Filed: May 13, 2010

(65) Prior Publication Data

US 2011/0109212 A1    May 12, 2011

(30) Foreign Application Priority Data

Nov. 12, 2009 (CN) .......................... 2009 1 0309560

(51) Int. Cl.
*H04M 1/00* (2006.01)
*H04M 9/00* (2006.01)

(52) U.S. Cl. ................. 379/433.12; 455/575.4

(58) Field of Classification Search ............. 379/433.11, 379/433.12; 455/575.1, 575.4; 361/679.39, 361/727; 16/326, 327, 328
See application file for complete search history.

(56) References Cited

U.S. PATENT DOCUMENTS

| | | | |
|---|---|---|---|
| 2006/0057892 A1* | 3/2006 | Bricaud et al. | 439/630 |
| 2007/0032278 A1* | 2/2007 | Lee et al. | 455/575.4 |
| 2007/0076861 A1* | 4/2007 | Ju | 379/433.01 |
| 2008/0058039 A1* | 3/2008 | Lee et al. | 455/575.4 |

* cited by examiner

*Primary Examiner* — Tuan Nguyen
(74) *Attorney, Agent, or Firm* — Altis Law Group, Inc.

(57) ABSTRACT

A sliding mechanism comprises a sliding plate, a main plate, a sliding enabling member, a biasing member and a stopping member. The sliding plate has sidewalls and the main plate has peripheral walls corresponding to the sidewalls, respectively. The slide enabling member is coupling the sidewalls to the peripheral walls such that the sliding plate is slid relative to the main plate between closed and open position. The biasing member provides a force for biasing the sliding plate to slide relative to the main body. The stopping member is coupled between the sliding plate and the main plate. When the sliding plate is slid from the open position to the closed position, the stopping member provides a mechanism for the sliding plate to steadily slide relative to the main plate and to firmly stop in the closed position.

13 Claims, 4 Drawing Sheets

SLIDING MECHANISM AND ELECTRONIC DEVICE HAVING THE SAME

BACKGROUND

1. Technical Field

The disclosure generally relates to electronic devices, and particularly to electronic devices having sliding mechanisms.

2. Description of Related Art

A typical slidable portable electronic device, such as a mobile phone, generally includes a cover with a display mounted thereon, a base with a keypad mounted thereon, and a sliding mechanism comprising a retaining plate and a sliding plate slidably mounted to the retaining plate. The cover is mounted to the sliding plate and the base is mounted to the retaining plate, so that the cover can slide relative to the base when the sliding plate moves relative to the retaining plate. However, stopping members of typical slidable portable electronic devices are weak and easily wear out over time and therefore can be unreliable.

Therefore, there is room for improvement within the art

BRIEF DESCRIPTION OF THE DRAWINGS

Many aspects of the exemplary sliding mechanism and an electronic device employing the same can be better understood with reference to the following drawings. The components in the various drawings are not necessarily drawn to scale, the emphasis instead being placed upon clearly illustrating the principles of the exemplary sliding mechanism and an electronic device employing the same. Moreover, in the drawings, like reference numerals designate corresponding parts throughout the diagrams.

DETAILED DESCRIPTION OF THE EXEMPLARY EMBODIMENT

In this exemplary embodiment, the device is an electronic device such as a mobile telephone. The mobile telephone described herein is a representation of the type of wireless communication device that may benefit from the present invention. However, it is to be understood that the present invention may be applied to any type of hand-held or portable device including, but not limited to, the following devices: radiotelephones, cordless phones, paging devices, personal digital assistants, portable computers, pen-based or keyboard-based handheld devices, remote control units, portable media players (such as an MP3 or DVD player) that have wireless communication capability and the like. Accordingly, any reference herein to the mobile telephone should also be considered to apply equally to other portable wireless electronic devices.

Figure 1:
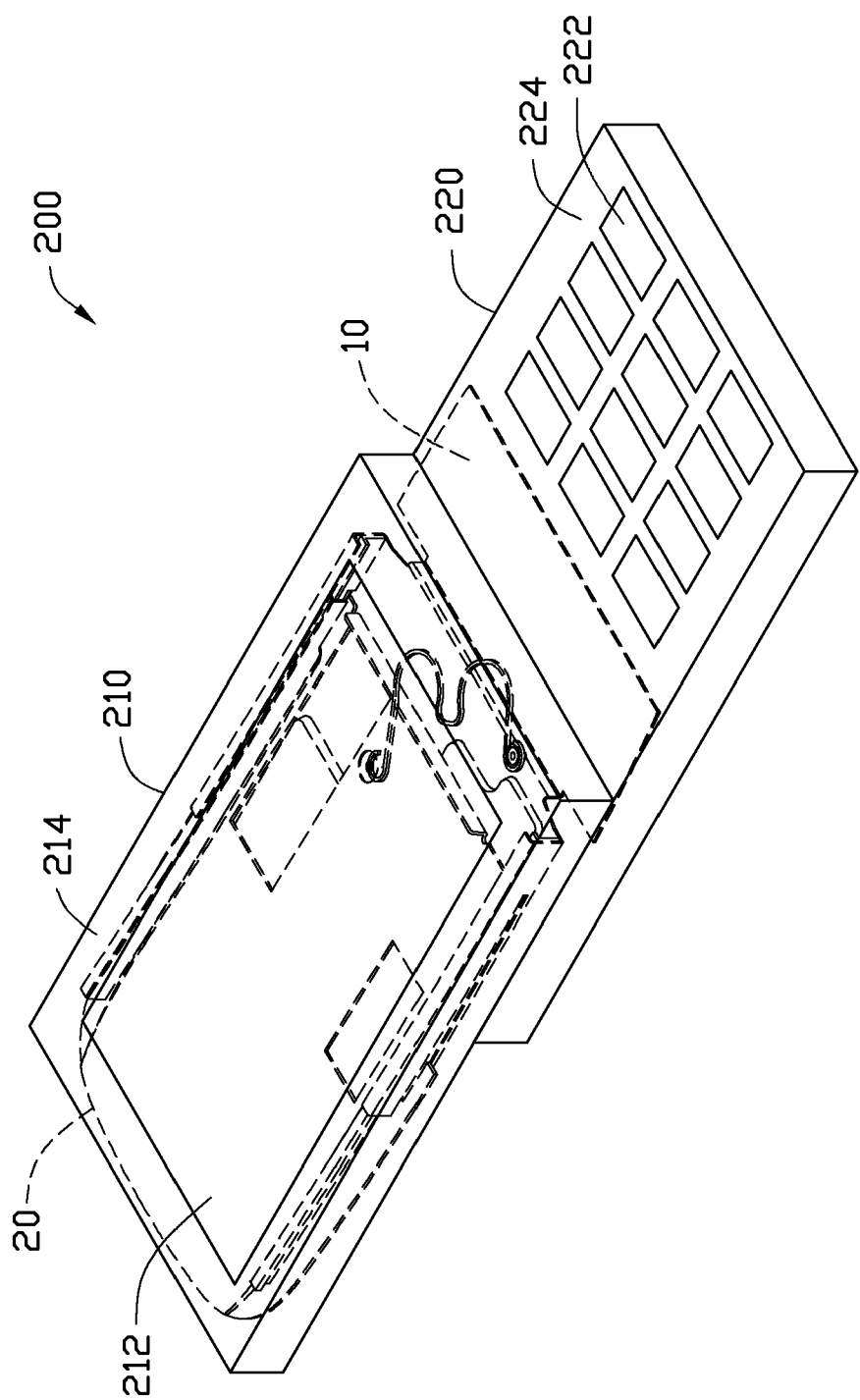
FIG. 1 is a schematic, perspective view of an exemplary electronic device employing a sliding mechanism according to an exemplary embodiment, wherein the electronic device is in an open position.

An exemplary embodiment of an electronic device 200 incorporating a sliding mechanism 100 is shown in FIG. 1. FIG. 1 illustrates a perspective view of the electronic device 200 in an extended, slid or open position. The exemplary device 200, which may be a mobile telephone in this case, includes a first housing 210 and a second housing 220 which are slidably coupled by the sliding mechanism 100. A display 212 is mounted on an upper surface 214 of the first housing 210, and a keypad 222 is mounted to an upper surface 224 of the first housing 220. The second housing 220 can be slid relative to the first housing 210 under the sliding mechanism 100, to expose the keypad 222 for using the device.

Figure 2:
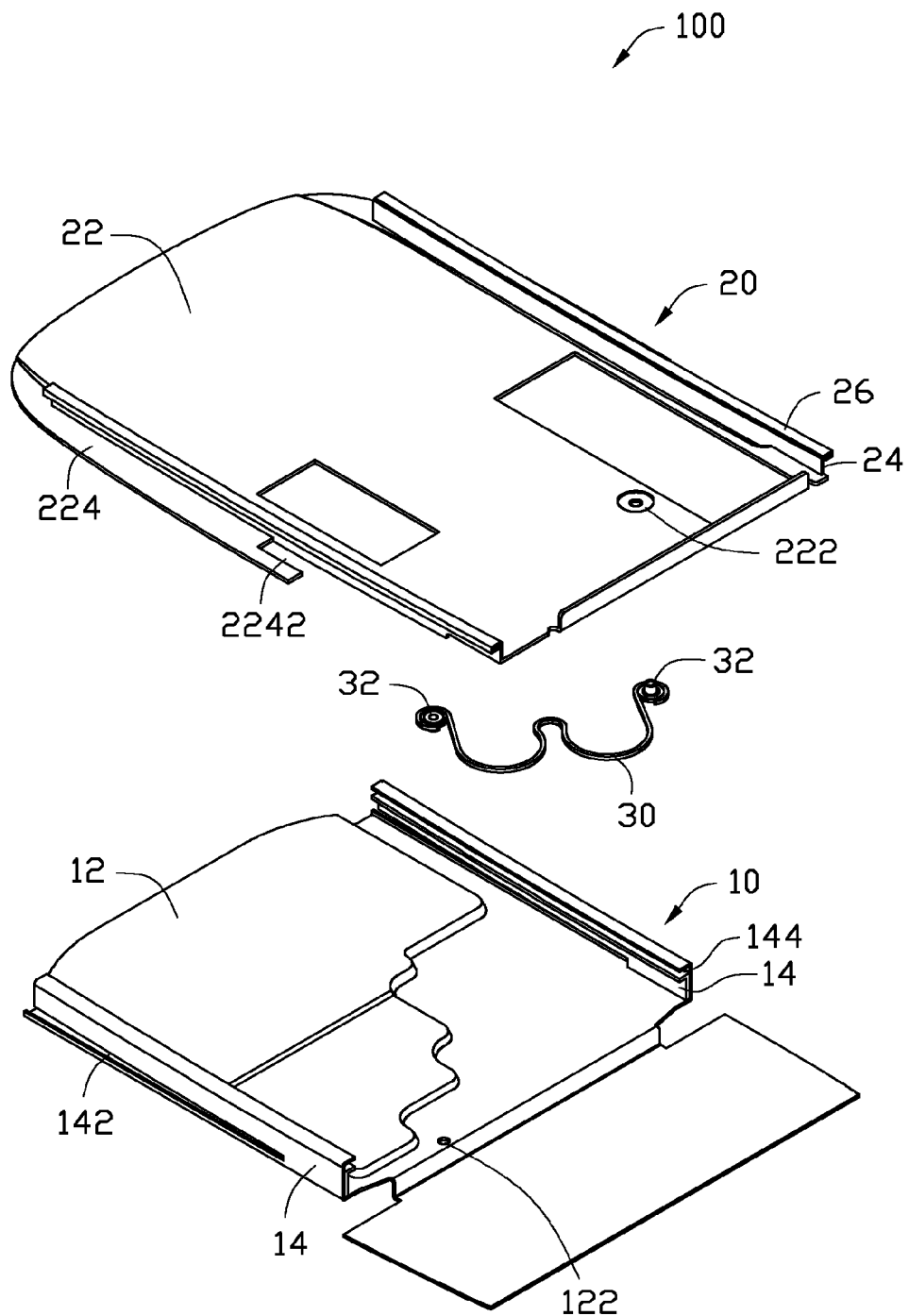
FIG. 2 is an exploded view of the sliding mechanism shown in FIG. 1.
Figure 3:
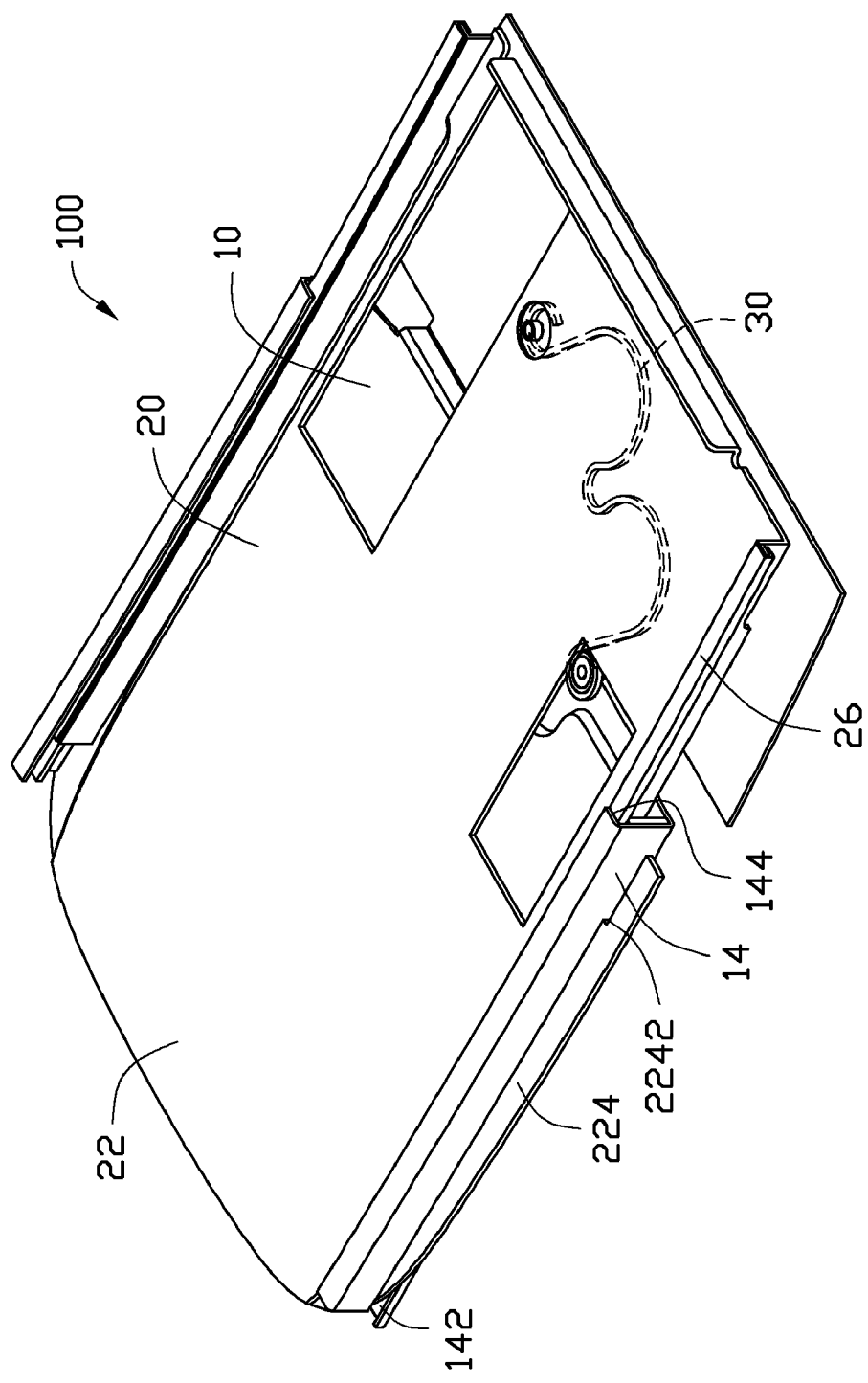
FIG. 3 is an assembled and perspective view of the sliding mechanism shown in FIG. 2, wherein the sliding mechanism is in a closed position.

Referring to FIGS. 2-3, the sliding mechanism 100 includes a sliding plate 20 and a main plate 10 which are slidably coupled by a slide enabling member (not labeled). The sliding plate 20 is mounted to the first housing 210 of the device 200 and the main plate 10 is mounted to the second housing 220 of the device 200 so that the first housing 210 can be slid with the sliding plate 20 with respect to the second housing 220 when the sliding plate 20 slides relative to the main plate 10.

The sliding plate 20 has a main body 22 and opposite sidewalls 24 protruding from opposite edges of the main body 22. The main plate 10 has a base board 12 and opposite peripheral walls 14 protruding from opposite edges of the base board 12. When the sliding plate 20 is mounted to the main plate 10, the sidewalls 24 are opposite to and adjacent to the peripheral walls 14, correspondingly.

Figure 4:
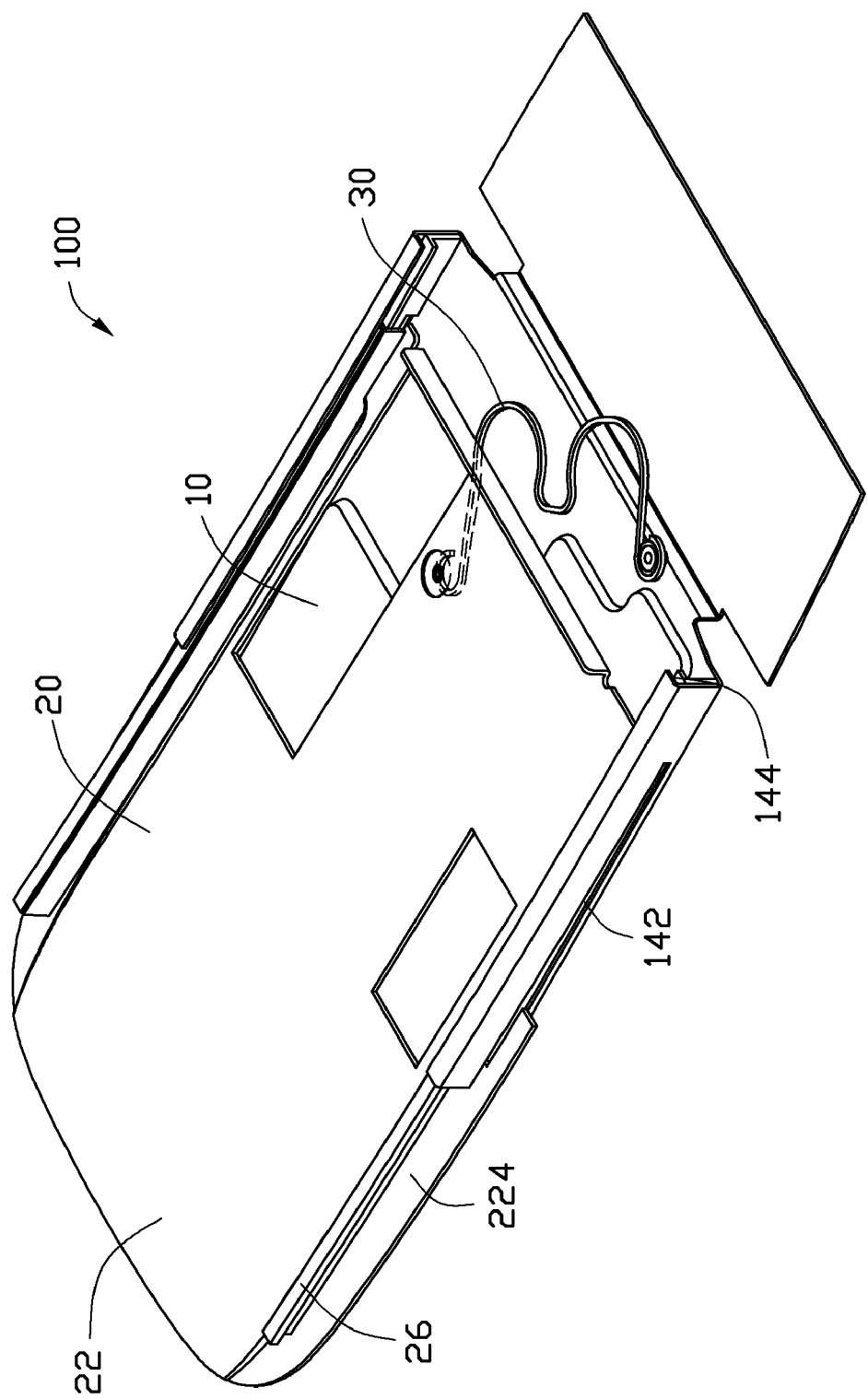
FIG. 4 is similar to FIG. 3, but showing the sliding mechanism in an open position.

The slide enabling member is coupled between the sidewalls 24 of the sliding plate 20 and the peripheral walls 14 of the main plate 10 such that the sliding plate 20 is slidably engaged with the main plate 10. The slide enabling member, in this embodiment, comprises a set of rails 26 and a set of tracks 144 that engage the rails 26. The rails 26 are longitudinally protruding from outer surfaces of the sidewalls 24 of the sliding plate 20 and the tracks 144 are longitudinally defined in inner surfaces of the peripheral walls 14 of the main plate 10. The sliding plate 20 slides along the rails 26 between a closed position shown in FIG. 3 and an open position shown in FIG. 4.

Referring to FIGS. 2 and 3, a stopping member is coupled between the sliding plate 20 and the main plate 10. When the sliding plate 20 is slid from the open position shown in FIG. 4 to the closed position shown in FIG. 2, the stopping member provides a mechanism for the sliding plate to steadily slide relative to the main plate 10 and to firmly stop in the closed position shown in FIG. 2. The stopping member, in this embodiment, comprises two stopping plates 224 which are respectively located at outer surfaces of the two sidewalls 24 of the sliding plate 20 and two slots 142 respectively defined in the peripheral walls 14 corresponding to the stopping plates 224. The stopping plates 224 are slid in the slots 142 when the sliding plate 20 slides relative to the main plate 10, to assist the sliding plate 20 to slide relative to the main plate 10. Furthermore, each stopping plate 224 has a latching notch 2242 defined one end thereof, the latching notches 2242 are configured to latch with the peripheral wall 14 of the main plate 10 when the sliding plate 20 is in closed position shown in FIG. 3, so that the sliding plate 20 is firmly held in the closed position.

Referring to FIGS. 2 and 3, a biasing member 30 is coupled between the sliding plate 20 and the main plate 10. When the sliding plate 20 is slid from the closed position shown in FIG. 3 to an intermediate position (not shown), the biasing member 30 is distorted to exert a force on the sliding plate 20 and the main plate 10, causing the sliding plate 20 to automatically slide toward the open position shown in FIG. 4 once the sliding plate 20 crosses the intermediate position. The biasing member 30 may be a distortion spring having two latching portions 32 respectively located at two ends thereof, one latching portion 32 is latched in a latching slot 222 of the sliding plate 20, and the other latching portion 32 is latched in a latching slot 122 of the main plate 10. The biasing member 30 also acts as a stopping member 224 that applies a constant bias force to urge the sliding mechanism 100 is steadily positioned in the closed position shown in FIG. 2 and the open position shown in FIG. 4.

It is to be further understood that even though numerous characteristics and advantages of the exemplary embodiments have been set forth in the foregoing description, together with details of structures and functions of various embodiments, the disclosure is illustrative only, and changes may be made in detail, especially in matters of shape, size, and arrangement of parts within the principles of the exemplary invention to the full extent indicated by the broad general meaning of the terms in which the appended claims are expressed.

What is claimed is:

1. A sliding mechanism, comprising:
   a sliding plate having sidewalls located at opposite edges thereof;
   a main plate having peripheral walls located at opposite edges thereof corresponding to the sidewalls of the sliding plate, respectively;
   a slide enabling member coupling the sidewalls of the sliding plate to the peripheral walls of the main plate such that the sliding plate can be slid relative to the main plate between open and closed positions;
   a biasing member providing a force for biasing the sliding plate to slide relative to the main plate; and
   a stopping member coupled between the sliding plate and the main plate, wherein when the sliding plate is slid from the open position to the closed position, the stopping member provides a mechanism for the sliding plate to steadily slide relative to the main plate and to firmly stop in the closed position.

2. The sliding mechanism as claimed in claim 1, wherein the stopping member comprises stopping plates respectively located at outer surfaces of the sidewalls of the sliding plate and slots respectively defined in the peripheral walls of the main plate corresponding to the stopping plates, the stopping plates are slid in the slots when the sliding plate slides relative to the main plate.

3. The sliding mechanism as claimed in claim 2, wherein each stopping plate has a latching notch defined one end thereof, the latching notches are configured to latch with the peripheral wall of the main plate when the sliding plate is in closed position, so that the sliding plate is firmly positioned in the closed position.

4. The sliding mechanism as claimed in claim 1, wherein the slide enabling member comprises a set of rails and a set of tracks that engage the rails; the rails longitudinally protruding from outer surfaces of the sidewalls of the sliding plate and the tracks longitudinally defined in inner surfaces of the peripheral walls of the main plate.

5. The sliding mechanism as claimed in claim 1, wherein the biasing member is a distortion spring, which is coupled between the sliding plate and the main plate.

6. An electronic device, comprising:
   a first housing;
   a second housing; and
   a sliding mechanism, comprising:
   a sliding plate being mounted to the first housing, the sliding plate having sidewalls located at opposite edges thereof;
   a main plate being mounted to the second housing, the main plate having peripheral walls located at opposite edges thereof corresponding to the sidewalls of the sliding plate, respectively;
   a slide enabling member coupling the sidewalls of the sliding plate to the peripheral walls of the main plate such that the sliding plate being slid relative to the main plate between open and closed positions;
   a biasing member providing a force for biasing the sliding plate to slide relative to the main body; and
   a stopping member coupled between the sliding plate and the main plate, wherein when the sliding plate is slid from the open position to the closed position, the stopping member provides a mechanism for the sliding plate to steadily slide relative to the main plate and to firmly stop in the closed position.

7. The electronic device as claimed in claim 6, wherein the stopping member comprises stopping plates respectively located at outer surfaces of the sidewalls of the sliding plate and slots respectively defined in the peripheral walls of the main plate corresponding to the stopping plates, the stopping plates are slid in the slots when the sliding plate slides relative to the main plate.

8. The electronic device as claimed in claim 7, wherein each stopping plate has a latching notch defined one end thereof, the latching notches are configured to latch with the peripheral wall of the main plate when the sliding plate is in closed position, so that the sliding plate is firmly positioned in the closed position.

9. The electronic device as claimed in claim 6, wherein the slide enabling member comprises a set of rails and a set of tracks that engage the rails; the rails longitudinally protruding from outer surfaces of the sidewalls of the sliding plate and the tracks longitudinally defined in inner surfaces of the peripheral walls of the main plate.

10. The electronic device as claimed in claim 6, wherein the biasing member is a distort spring, which is coupled between the sliding plate and the main plate.

11. A sliding mechanism, comprising:
    a main plate;
    a sliding plate being slidably mounted to the main plate;
    a slide enabling member coupling the sliding plate to the main plate such that the sliding plate being slid relative to the main plate; and
    a stopping member coupled between the sliding plate and the main plate, wherein the stopping member has stopping plates longitudinally located at edges of the sliding plate and slots longitudinally defined in edges of the main plate, when the sliding plate slides relative to the main plate, the stopping plate is slid in the slots relative to the main plate to assist the sliding plate to slide relative the main plate.

12. The sliding mechanism as claimed in claim 11, wherein each stopping plate has a latching notch defined one end thereof, which is configured to latch with the main plate to stop a sliding movement of the sliding plate to slide relative to the main plate, so that the sliding plate is firmly stopped relative to the main plate.

13. The sliding mechanism as claimed in claim 11, wherein the sliding plate has sidewalls located at opposite edges thereof; the main plate having peripheral walls located at opposite edges thereof corresponding to the sidewalls of the sliding plate, respectively; the stopping plates are respectively located at the sidewalls of the sliding plate and the slots are respectively defined in the peripheral walls of the main plate.

* * * * *